June 30, 1936.  F. VOTTELER  2,046,139
METHOD OF MAKING TUBES AND APPARATUS THEREFOR
Filed Oct. 30, 1934  2 Sheets-Sheet 1
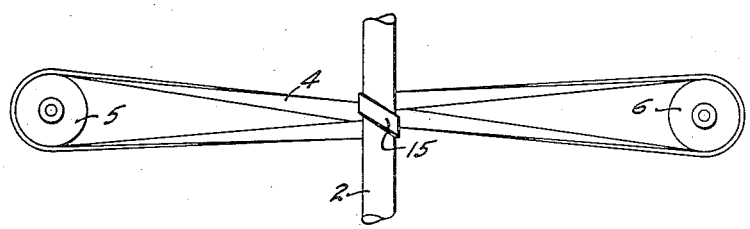
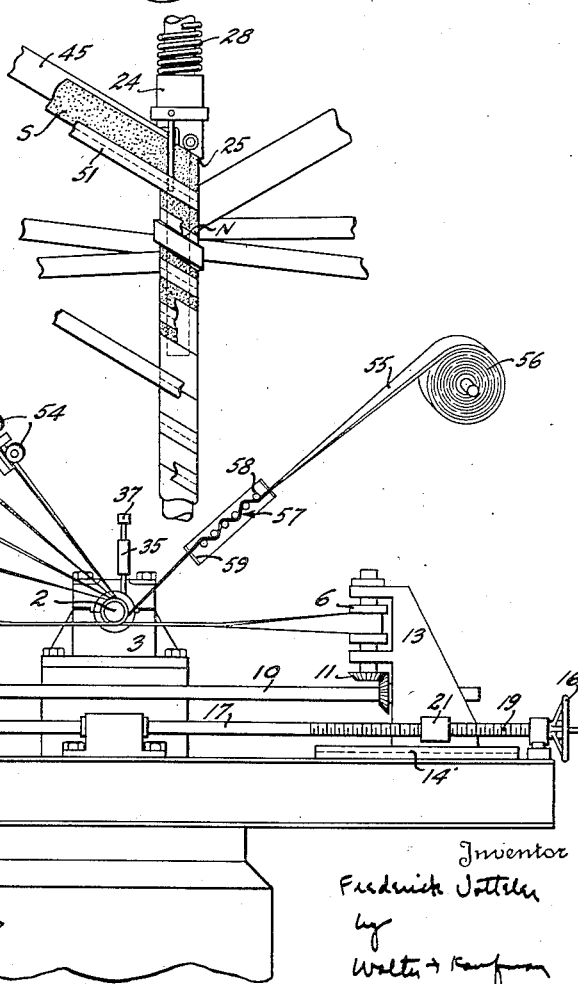

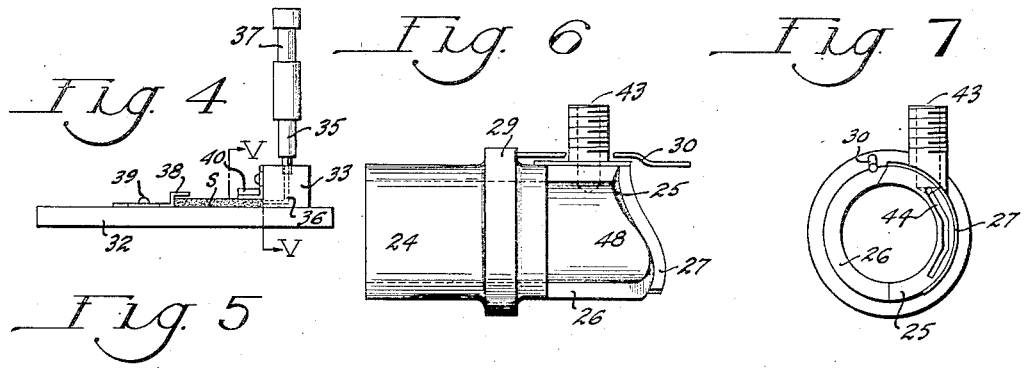
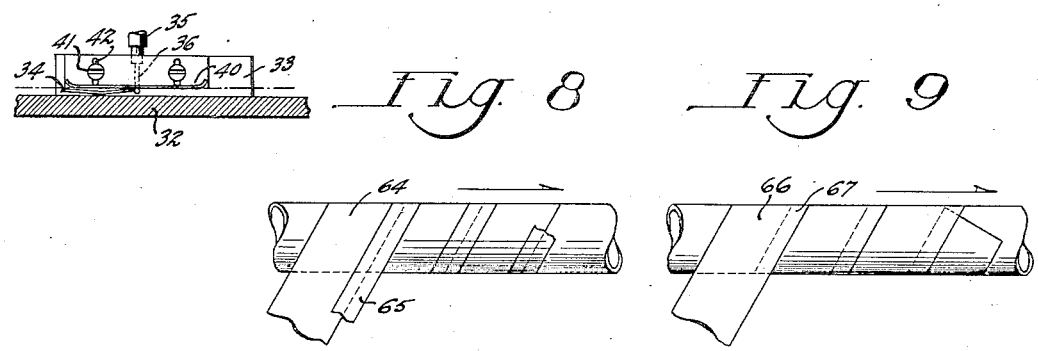
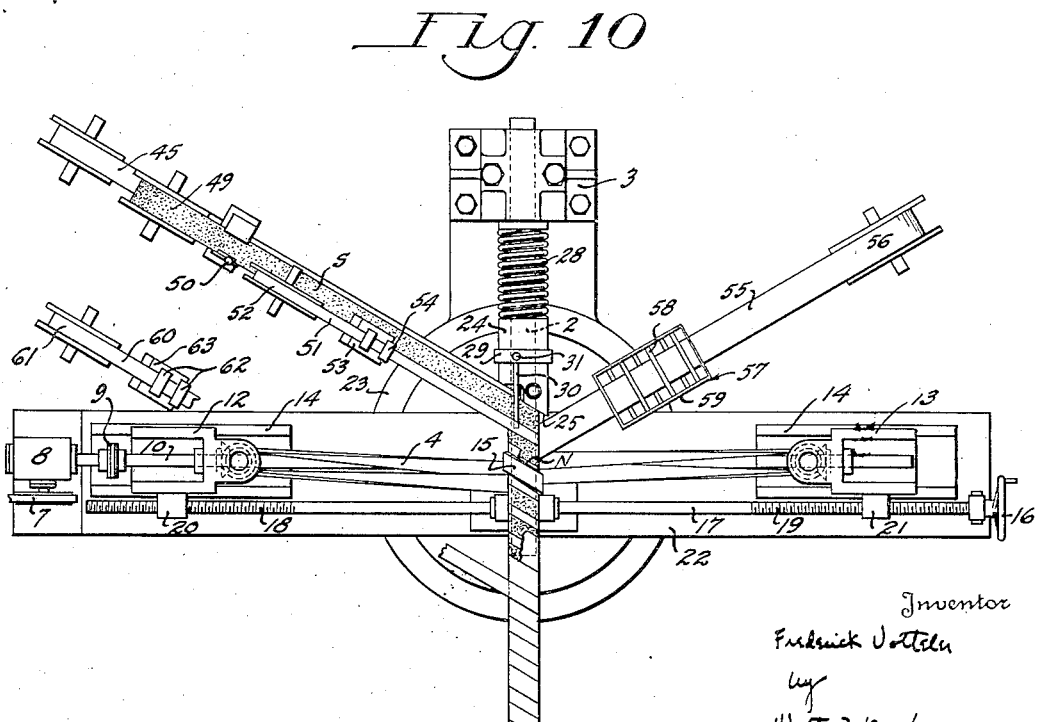

Patented June 30, 1936

2,046,139

UNITED STATES PATENT OFFICE 2,046,139

METHOD OF MAKING TUBES AND APPARATUS THEREFOR

Frederick Votteler, Lancaster, Pa., assignor to Armstrong Cork Company, Lancaster, Pa., a corporation of Pennsylvania Application October 30, 1934, Serial No. 750,705

17 Claims. (Cl. 93—80)

This invention relates to a method of making tubes and to an apparatus for effectuating such method and more particularly to a method of manufacturing tubes from a strip of cork composition helically disposed and held as a helix by an adhesive applied at the abutting edges and to a machine for helically winding a strip of material about a mandrel while continuously feeding the formed tube from the mandrel, said machine including means for urging the abutting edges into firm engagement.

My method and apparatus are particularly adapted for the manufacture of single thickness helically wrapped cork tubes for subsequent fabrication into textile cots. Cots of this type are disclosed in the copending application of Charles W. St. Claire, Serial No. 611,983, filed May 18, 1932, and comprise a ribbon of cork composition helically disposed and held as a helix solely by a flexible adhesive disposed at the joints.

Because of the desirability of using a relatively slow setting adhesive in order to provide a uniform product without hard lines at the joints caused by the interposition of a hard, inflexible, quick setting adhesive, all prior methods have contemplated winding the strip upon a revolving mandrel; urging the edges into firm engagement; securing the strip to the mandrel and storing the mandrel with its applied covering until the adhesive has set.

In the copending application of William B. Tucker, Serial No. 750,704, filed October 30, 1934, however, the tubes are formed on the apparatus herein disclosed and the process provides for continuous manufacture by the use, in Tucker's preferred process, of a strip of adhesive paper, the adhesive having quick setting characteristics, secured over the helical joint in the cork composition strip, and serving to hold the edges in firm engagement until the adhesive has set. This securing strip may be removed by grinding in the truing-up operation performed upon the tube or subsequently upon the cot applied to a roll.

While my method is somewhat analogous to that disclosed in the copending Tucker application, the differentiations therefrom will be readily apparent upon further detailed description of my method and when certain characteristics of the two methods are compared.

It is an object of my invention to provide a method of making cork composition tubes whereby the tubes will be well formed and will have firm, tight joints, even though the inner diameter be relatively small and the wall thickness relatively great. Cork composition as commonly used in this art is highly resilient and resists deformation, always tending to return to its original shape. It will be apparent, therefore, that any attempt to wrap a relatively thick strip of cork composition about a mandrel having a relatively small diameter will be a difficult task, for the cork strip will tend to straighten out, resisting compression caused by bending. This is particularly true if the composition be relatively dense. It is necessary, therefore, to securely hold the strip in a cylindrical shape with the edges in firm abutting engagement. As pointed out above, the adhesive used in forming the tube is relatively slow setting and it is, therefore, desirable to employ means for holding the ribbon in position which will be effective at least as soon as the material is removed from the mandrel or other forming surface.

Another object of my invention is to provide a method of making cork composition tubes by helical disposition of a cork composition strip, by feeding a strip of cork composition to a mandrel and urging it about the axis of the mandrel while restricting free forward motion of the formed tube along the axis of the mandrel, and applying pressure to the oncoming edge of the strip as it is fed to the mandrel to feed it therealong and insure tight joints in the completed tube.

It is a further object of my invention to provide a mechanism which is substantially automatic in operation and which provides means for placing the strip positioned around a mandrel and being formed into a tube under compression; in my preferred embodiment, the means comprise a yielding pressure plate and a driving belt.

Other objects and advantages of my invention will become apparent to those skilled in this art upon further consideration of this specification and the drawings which form a part thereof.

Broadly, my process contemplates forming a hollow cylindrical tube from a ribbon of cork composition by feeding said ribbon in a helical path about a mandrel, urging the edges into firm abutting engagement and thereafter forming a securing tube in situ about the cork composition tube on the mandrel prior to its removal therefrom. The completed tube is preferably removed from the mandrel by continued feeding and helical movement thereof. In my preferred embodiment, the joint in the cork composition tube is held in position by a strip of adhesive paper or the like secured thereover and a confining strip or strips positioned thereabout, the strips preferably covering the entire outer surface of the cork composition tube as it is formed. In one embodiment, however, the securing tape is eliminated and a confining tube formed of a helically disposed paper strip or strips adhesively held in position is employed, while in a further embodiment the confining tube is formed of an overlapped strip adhesively secured at the overlapped portion.

The confining tube may assume various forms but it should be such that it maintains the cork composition strip as a hollow cylindrical tube after removal from the mandrel and until the adhesive has set.

My apparatus includes a mandrel, preferably secured in fixed position, a driving mechanism for urging a strip of material in a helical path about the mandrel and for feeding the completed tube from the mandrel and pressure means for urging the oncoming edge into firm engagement with the portion previously applied to the mandrel, the belt restricting free forward movement of the material along the axis of the mandrel.

In order that my invention may be more readily understood, I will describe the same in connection with the accompanying drawings in which:

Figure 1 is a top plan view of a feeding and driving belt positioned about a mandrel;

Figure 2 is a similar view showing the various strips of material positioned about a mandrel;

Figure 3 is a view in front elevation of my preferred apparatus, with the supply rolls schematically shown for greater clarity;

Figure 4 is a similar view of my preferred glue feeding device;

Figure 5 is a sectional view taken on the line V—V of Figure 4;

Figure 6 is a detailed view in side elevation of a pressure applying device adapted to be positioned about the mandrel;

Figure 7 is an end elevation of the pressure plate of Figure 6;

Figures 8 and 9 illustrate modifications of my method of forming securing tubes; and Figure 10 is a top plan view of the apparatus of Figure 3.

Referring to Figures 1, 2, 3 and 10, my apparatus comprises a mandrel 2 secured in a fixed position in a head 3. A driving belt 4 encircles the mandrel 2 and pulleys 5 and 6 and is driven by a motor (not shown) through a pulley 7, a reduction unit 8, a flexible coupling 9, a shaft 10 and gearing 11. The pulleys 5 and 6 are mounted in supports 12 and 13 respectively, which supports are slidably mounted on base plates 14 and 14' for adjustment of the tension applied to the driving belt 4. The belt 4 is wrapped about the mandrel 2 in a helix 15 (Figures 1 and 10) and tension may be applied to the belt 4 by movement of the heads 12 and 13 away from the mandrel 2. In my preferred embodiment this is effectuated by rotation of a hand wheel 16 secured to a shaft 17 which has oppositely threaded portions 18 and 19 engageable with lugs 20 and 21 positioned upon the supports 12 and 13 respectively. The belt driving and tensioning mechanism is secured to a support 22 which is in turn rotatably secured to a base 23 whereby the mechanism may be rotated as a unit with respect to the mandrel 2 and the helix angle of the belt 4 with respect to the mandrel 2 may be thereby conveniently changed to suit the particular helix angle of the material being operated upon as will be more fully hereinafter set forth.

As previously pointed out, my invention comprehends a winding machine including a pressure plate which engages one longitudinal edge of a strip of tube forming material S fed to the mandrel and urges the opposite edge into firm engagement with the edge of the previously applied portion.

In my preferred embodiment, illustrated in Figures 6 and 7, a pressure plate in the form of of a sleeve 24 is provided which is slidably fixed to the mandrel 2. This pressure plate has an extended surface 25, in the form of a helix, the angle of which corresponds to the helix angle of the strip S. It will be understood that the helix angle will vary depending on the diameter of the mandrel upon which the strip is being wound and also depending upon the width of the strip. Care should be exercised in determining the curvature of the surface 25 so that it contact with a strip to be operated upon over an extended area. As shown in Figures 6 and 7, approximately one-half of a complex helix is formed, the other half of the sleeve being cut away as at 26 to permit application of a strip of non-frictional material to the mandrel prior to application of the strip S as will be more fully hereinafter described. A hold-down plate 27 is provided and serves to prevent movement of the strip S away from the mandrel upon the application of pressure. The surface 25 should preferably be equivalent in thickness to the strip being operated upon although it may be greater or somewhat lesser in thickness if desired.

In my preferred embodiment, suitable means are provided for urging the pressure plate axially of the mandrel into engagement with the strip S being operated upon, such for example as a spring 28. In order to prevent the sleeve from moving axially beyond a predetermined point, the mandrel may be provided with a key and the sleeve provided with a suitable keyway to limit outward movement. This also serves to prevent rotation of the sleeve with respect to the mandrel, always holding the sleeve in proper alignment with respect to the material being operated upon. If desired the spring 28 may be eliminated and the guiding surface may be held in stationary position on the mandrel 2.

If desired, the sleeve 24 may be provided with a shoulder 29 adapted to receive a hold-down finger 30 secured in position on the shoulder by means of a set screw 31. This hold-down finger is provided to urge the edge of the ribbon downwardly into engagement with the mandrel. The hold-down finger 30 is preferably so positioned that it engages the strip being operated upon immediately in advance of the position of application of pressure by the surface 25.

In Figures 4 and 5 a device for applying adhesive to a longitudinal edge of the strip of material being formed into a tube is shown. This device is designed primarily for use with relatively viscous adhesives and comprises essentially a base 32 upon which is mounted a guide 33 provided with an adhesive applying groove 34 which communicates with a receptacle 35 through an opening 36. The adhesive is placed in the receptacle 35 and pressure applied thereto by a weighted plunger 37 slidably mounted in the receptacle 35. It will be noted that the groove 34 is so cut that adhesive travelling through the opening 36 and into the groove 34 will be applied to substantially the entire height of the longitudinal edge of the strip of sheet material S. In order to insure that the edge to be coated will be in firm engagement with the guide 33, a guiding plate 38 is provided which is secured to the base 32 by means of machine screws 39. This plate 38 may be provided with slots through which the screws 39 pass, whereby various widths of ribbon may be operated upon by adjustment of the plate 38. A similar plate 40 is provided for holding the material S firmly in engagement with the base 32. This plate, like the plate 38, is secured in position by means of screws 41 passing through slotted openings 42 in the plate.

If desired, the other longitudinal edge of the strip S may be coated with adhesive applied at the pressure surface 25. In Figures 6 and 7 the pressure sleeve is illustrated as provided with a threaded plug 43 communicating with a groove 44 formed on the helical surface 25 thereof. A pressure feeding device such as illustrated in Figures 4 and 5 may be placed in communication with the plug 43 and serve to supply adhesive to the feeding groove 44. Other details of the mechanism will be considered in connection with the description of the method of my invention.

It has been found that cork composition, because of its highly frictional character, cannot be readily removed from a mandrel if it be wrapped tightly therearound. For that reason, in my method, I prefer to apply a base strip 45 over the mandrel 2 prior to application of the cork composition strip S. This strip 45 may be in the form of an oil-coated paper or may be kraft paper as illustrated in Figure 3, to the underside of which is applied a lubricating material, such as tallow, from a receptacle 46; the lubricating material being applied under pressure from the cup 47. The strip 45 is fed against the mandrel and in engagement therewith and with the surface 48 of the pressure sleeve 24 and is preferably of a width sufficient to cover the entire mandrel without overlapping.

A strip of cork composition S or other suitable base material is fed from a roll 49 and adhesive is applied to a longitudinal edge thereof by a suitable feeding mechanism 50 which may be in the form illustrated in Figures 4 and 5. This strip S is wrapped helically about the mandrel over the previously applied paper or other non-frictional strip 45. As previously pointed out, adhesive may be applied to the other longitudinal edge by a suitable applicator arranged in the pressure sleeve 24. If desired, a strip of adhesive paper 51 may be fed from a roll 52 and moistened by water applied from the receptacle 53; the paper being urged into engagement therewith by the rollers 54. Care should be exercised to insure that the tape is applied only after the abutting edges of the strip are urged into firm engagement by the pressure sleeve 24, and the hold-down finger 30.

A confining tube is then formed about the helically wrapped cork composition strip and, as illustrated in Figures 3 and 10, this tube may comprise a paper strip 55 fed from a roll 56. Tension is preferably applied to the paper by means of a tensioning device 57 which comprises a plurality of bars 58 mounted in a frame 59. The paper is led alternately over and under the bars and tension is thereby applied to the paper. This paper strip is preferably wound as a helix with the joint non-coincident with the joint in the cork composition strip and the width of the paper is preferably the same as the width of the cork composition strip and fed at the proper helix angle to avoid progressive "creep" and thereby coincidental joints at spaced intervals. The paper strip may be held in position by means of a strip of adhesive paper 60 fed from a roll 61, which tape may be moistened by means of rollers 62 urging the paper into engagement with a moistened pad in a receptacle 63.

The strips of material are urged forwardly and about the axis of the mandrel by the belt 4. In order to insure that the formed tube will have tight, closed joints, the strip of base material S as it is fed to the mandrel 2 is urged into engagement with the previously applied portion by the pressure sleeve 24, and compressed between the nip N of the driving belt 4 and the surface 25 of the pressure plate 24. This is accomplished by having the angle of incidence of the belt 4 with respect to the mandrel 2 greater than the angle of incidence of the base strip S with respect to the mandrel 2. As previously pointed out, the position of the belt 4 with respect to the mandrel 2 may be conveniently changed by rotation of the driving unit with respect to the mandrel. It should be borne in mind that the helix angle for a given size mandrel will vary depending upon the width of the strip being helically wrapped thereabout, if the edges of the strip are to be contiguous; the angle decreasing as the width decreases. It will be evident, therefore, that the width of the driving belt, for any given size mandrel and width of base strip, should be somewhat less than the width of the base strip since the belt is helically disposed about the mandrel with an angle of incidence thereto greater than that of the base strip. If the belt and strip were the same width, it would be impossible to dispose the belt at an angle of incidence greater than that of the base strip because the edges of the belt would be contiguous when the angle of incidence of the base strip is reached. The increase in diameter caused by the application to the mandrel of the base strip over which the driving belt is positioned should also be taken into consideration. By the angle of incidence I mean the angle between the strip or belt and the axis of the mandrel.

It will be understood that with a driving belt having a greater angle of incidence and a lesser helix angle than that of the strip to be formed into a tube, the belt will not move the strip forwardly along the axis of the mandrel at a rate sufficient to accommodate the material being fed to the mandrel by rotation of the previously applied portion about the mandrel; the rate of feed decreasing as the angle of incidence increases.

In other words, the helix angle determines the amount of forward movement for each revolution of the material about the mandrel; the lesser the helix angle, the less forward movement for each revolution. Thus, with the belt positioned about the mandrel at an anagle of incidence greater than the base strip or at a helix angle less than the helix angle of the strip, the base strip will normally "creep" rearwardly along the mandrel away from the nip of the belt. This rearward movement is arrested by the pressure plate 24 which places the material positioned about the mandrel between its surface 25 and the nip N of the driving belt 4 under compression. The belt 4 should frictionally engage the strips being operated upon and there should be substantially no relative motion between the strips and the belt. As the pressure caused by the rearward "creep" develops, it causes the angle of incidence of the belt 4 with respect to the mandrel 2 to decrease until the helix angle thereof is substantially the same as that of the base strip, whereupon forward movement of the base strip along the axis of the mandrel is sufficient to avoid any additional "creep" and a substantially constant pressure is applied between the nip N and the surface 25; the force being supplied frictionally to the belt through the strips positioned about the mandrel in an amount sufficient to move the belt from its normal angle of incidence to the same angle of incidence as that of the base strip. The belt, being normally positioned at a greater angle of incidence to the mandrel 2 or lesser helix angle than the base strip, always tends to return to its normal position, thereby restricting free forward movement of the base material and its securing strips along the axis of the mandrel and consequently placing the tube, being formed, under compression, whereby tight joints are insured. The securing tube is formed about the base strip only after it is helically disposed and in engagement with the surface 25 of the pressure plate 24.

In Figures 8 and 9 modified types of confining tubes are illustrated. In both of these constructions no adhesive tape is applied directly to the face of the cork composition strip and, therefore, if the adhesive at the longitudinal edges of the strip be carefully applied, the confining tube may be readily removed without damage to the surface of the cork composition tube. It is customary in the cork composition tube art, however, to grind the surface to true up the tube and any adhesive paper which may be applied may be readily removed by this grinding operation. In Figure 8 the confining tube is in the form of a strip of paper 64 which is wrapped helically and overlaps the joint in the cork composition tube. The paper strip 64 is held in position about the tube by means of an adhesive paper strip 65 disposed over the joint in the paper covering 64 thus forming a confining tube which securely holds the cork composition in position. In Figure 9, a strip of paper 66 which forms a confining tube is wrapped with the edges overlapped as at 67 and adhesive applied to the overlapped portion. It may be desirable in this construction to apply the adhesive closely adjacent one edge of the paper and overlap the paper slightly greater than the width of the adhesive line so that there will be no adhesion of the paper to the cork composition.

While in the embodiments shown in the drawings, the confining tube is formed of a single helically disposed ribbon of paper, it is obvious that the tube may be formed in various ways and may comprise two or more layers; the required strength depending upon the wall thickness of the cork and its tendency to reexpand. In most instances a single wrapping such as illustrated in Figure 10 will be found satisfactory.

My process has been described in conjunction with a single wrapped tube of cork composition. It is obvious, however, that a plurality of cork composition layers may be utilized to form a built up structure. If a multi-layer product is desired, it will probably be found desirable to adhesively secure the layers together. Other suitable base material may be substituted for the cork composition herein disclosed.

While I have illustrated and described certain preferred embodiments of my invention, it will be understood that the invention is not so limited but may be otherwise practiced and embodied within the scope of the following claims.

I claim:

1. In a method of making single thickness tubes, the steps consisting in winding a strip of flexible base material having adhesive applied to at least one longitudinal edge thereof helically into a cylindrical shape, forming a securing tube in situ about the helically disposed base strip to hold the abutting edges of said strip in firm engagement until the applied adhesive has set, and thereafter removing the securing tube.

2. In a method of making tubes, the steps consisting in applying adhesive to a longitudinal edge of a strip of flexible base material, feeding said strip to a stationary mandrel, urging the abutting edges into firm engagement, feeding a thin securing strip over the joint thus formed, urging the strips forwardly and about the axis of the mandrel, and applying a confining layer to the tube on the mandrel.

3. In a method of making tubes, the steps consisting in applying adhesive to a longitudinal edge of a strip of flexible base material, feeding said strip to a stationary mandrel, urging the abutting edges into firm engagement, thereafter feeding a relatively narrow, thin, securing strip over the joint thus formed and over a portion of the surface of the base strip, feeding a securing strip over substantially the entire area of the previously applied strips and urging all of said strips forwardly and about the axis of the mandrel.

4. In a continuous process for the manufacture of hollow cylindrical tubes formed of a helically disposed ribbon, held as a helix by an adhesive at the abutting edges of the ribbon, the steps consisting in continuously feeding to a mandrel and forwardly and about the axis thereof a ribbon of flexible base material having adhesive applied to at least one longitudinal edge thereof, a ribbon of thin, relatively narrow sheet material disposed over the ribbon and covering the abutting edges thereof and adhesively secured thereto, and a confining ribbon of sheet material disposed to cover the base material and sheet material ribbons and continuously applying pressure to a longitudinal edge of said base ribbon at the point of application to the mandrel.

5. In a method of making hollow cylindrical cork composition tubes formed of a single helically disposed cork composition ribbon held as a helix by an adhesive at the abutting edges of the ribbon by a continuous process, the steps consisting in progressively feeding a ribbon of cork composition having adhesive applied to at least one longitudinal edge thereof to a stationary mandrel and urging said ribbon forwardly and about the axis of said mandrel, and continuously applying pressure to a longitudinal edge of said ribbon over an extended area as it is fed to said mandrel while restricting free forward movement of said ribbon along the axis of said mandrel to press the abutting edges into firm engagement with each other and with the adhesive disposed therebetween to form a closely bonded edge joint.

6. In a method of making tubes by a continuous process, the steps consisting in urging a ribbon of flexible base material having adhesive applied to a longitudinal edge thereof helically about a stationary mandrel and moving said ribbon about said mandrel and along the axis thereof by applying rotative force thereto at a helix angle normally less than the helix angle of the ribbon, and applying pressure to a longitudinal edge of said ribbon over an extended area to urge the oncoming edge into firm engagement with the previously applied portion and to cause the driving force to assume substantially the same helix angle as that of the ribbon disposed about the mandrel.

7. In the method of making tubes by that process which comprises applying adhesive to at least one longitudinal edge of a ribbon of flexible base material, and forming said ribbon into a hollow tube with a helically disposed joint, the steps consisting in forming about said tube a confining layer and adhesively securing said layer in position about said base material without adhesion to the surface thereof.

8. In a tube forming machine, the combination of a mandrel, means for helically winding a strip of material about said mandrel and for continuously feeding a formed tube from the mandrel, and means for applying pressure to a longitudinal edge of said strip as it is fed about said mandrel comprising a sleeve slidably mounted upon said mandrel and having an extended surface for engagement with a longitudinal edge of said strip and means for continuously urging said surface into engagement with said strip.

9. In a tube forming machine, the combination of a mandrel, means for helically winding a strip of material about said mandrel and for continuously feeding a formed tube from the mandrel, an engaging plate having an extended surface for engagement with a longitudinal edge of said strip, a guiding finger adapted to engage the opposite longitudinal edge of said strip, and means for urging the plate axially of the mandrel.

10. In combination with a tube forming machine having a mandrel and means for helically winding a strip of material about said mandrel and for continuously feeding a formed tube from the mandrel, of a pressure plate adapted to engage a longitudinal edge of said strip and adhesive feeding means associated with said plate.

11. In a tube forming machine, the combination of a mandrel, means for helically winding a strip of material about said mandrel and for continuously feeding a formed tube from the mandrel, and a spring urged guiding plate adapted to engage one longitudinal edge of a strip of material to be helically disposed to form a tube to confine said strip between said winding means and said plate and urge the edges into firm engagement.

12. In a tube forming machine, the combination of a mandrel, means for helically winding a strip of material about said mandrel and for continuously feeding a formed tube from the mandrel, and a spring urged guiding plate adapted to engage one longitudinal edge of a strip of material to be helically disposed to form a tube to confine said strip between said winding means and said plate and urge the edges into firm engagement and means for forming a securing tube over said strip.

13. In a tube forming machine, the combination of a mandrel, means for helically winding a strip of material about said mandrel and for continuously feeding a formed tube from the mandrel, guiding means for engaging a longitudinal edge of a strip of material to be operated upon and means for yieldingly urging said guiding means axially of the mandrel.

14. In a tube forming machine, the combination of a mandrel, means for helically winding a strip of material about said mandrel and for continuously feeding a formed tube from the mandrel, a guide collar positioned about said mandrel, a helical surface on said collar for engagement with a longitudinal edge of a strip of material to be operated upon, the helix angle of which corresponds to the helix angle to be assumed by said strip, and yielding means for urging said collar axially of the mandrel.

15. In a tube forming machine, the combination of a mandrel, means for applying rotative force to a strip helically disposed about said mandrel, the helix angle of said means being less than the helix angle of said strip, a pressure plate adapted to engage a longitudinal edge of said strip to limit any rearward creep of said strip on said mandrel and to apply pressure to said strip to cause said means to assume a helix angle substantially the same as the helix angle of said strip.

16. In a tube forming machine, the combination of a mandrel, a driving belt disposed in a helix about said mandrel and a helically disposed pressure plate associated with the mandrel, the helix angle of the belt being normally less than the helix angle of the pressure plate.

17. In the method of making tubes formed of a single helically disposed strip by that process which comprises forming a ribbon of flexible base material into a hollow cylindrical tube having a helically disposed joint, with the adjacent helically disposed edges in firm abutting engagement and adhesively secured, the steps consisting in winding a strip of flexible base material having adhesive applied to a longitudinal edge thereof helically about a forming surface and into a cylindrical shape with the edges in firm engagement, said strip of base material and said adhesive being of such character that the joint formed by the abutting edges of the strip will normally tend to open when the adhesive is first applied, forming a confining tube in situ around the base strip to hold the same in fixed position until the adhesive applied at the joint has set and removing the tube from the forming surface before the adhesive has set.

FREDERICK VOTTELER.